United States Patent [19]

Gosselin

[11] Patent Number: 5,802,668
[45] Date of Patent: Sep. 8, 1998

[54] CASTER ASSEMBLY

[75] Inventor: Robert G. Gosselin, Springfield, Mass.

[73] Assignee: Standex International Corporation, Salem, N.H.

[21] Appl. No.: 632,894

[22] Filed: Apr. 16, 1996

[51] Int. Cl.[6] .................................................. B60B 33/00
[52] U.S. Cl. ........................................................ 16/35 R
[58] Field of Search ............................ 16/35 R; 188/1.12

[56] References Cited

U.S. PATENT DOCUMENTS

| | | | |
|---|---|---|---|
| 918,636 | 4/1909 | Young | 16/35 R |
| 1,633,638 | 6/1927 | Jarvis et al. | 16/35 R |
| 1,733,536 | 10/1929 | Guitschula | 16/35 R |
| 1,863,349 | 6/1932 | Noelting et al. | 16/35 R |
| 2,434,863 | 1/1948 | Parkhill | 16/35 R |
| 2,512,941 | 6/1950 | Johnson | 16/35 R |
| 2,905,275 | 9/1959 | Kostolecki et al. | 16/35 R |
| 2,915,775 | 12/1959 | Skupas | 16/35 R |
| 3,239,873 | 3/1966 | Fisher | 16/35 R |
| 3,400,424 | 9/1968 | Altenweger | 16/35 R |
| 3,687,241 | 8/1972 | Fontana . | |
| 3,828,392 | 8/1974 | Bolger | 16/35 R |
| 3,876,041 | 4/1975 | Pivacek . | |
| 3,881,216 | 5/1975 | Fontana | 16/35 R |
| 3,942,608 | 3/1976 | Frank et al. | 188/1.12 |
| 3,985,208 | 10/1976 | Libhart | 16/35 R |
| 4,336,630 | 6/1982 | Page | 16/35 R |
| 4,664,231 | 5/1987 | James | 16/35 R |
| 4,681,192 | 7/1987 | James | 16/35 R |
| 5,040,265 | 8/1991 | France et al. . | |

FOREIGN PATENT DOCUMENTS

| | | | |
|---|---|---|---|
| 1223944 | 6/1960 | France | 16/35 R |
| 1461474 | 11/1966 | France | 16/35 R |
| 1271148 | 4/1972 | United Kingdom | 16/35 R |
| 2176395 | 12/1986 | United Kingdom | 16/35 R |
| 2187946 | 9/1987 | United Kingdom | 16/35 R |

*Primary Examiner*—Chuck Mah
*Assistant Examiner*—Donald M. Gurley
*Attorney, Agent, or Firm*—Fishman, Dionne, Cantor & Colburn

[57] ABSTRACT

A caster assembly having rattle-free operation is presented. The caster comprises an inverted U-shaped horn member carrying an axle (i.e., a shoulder bolt). A wheel rotating on a spanner is supported between leg portions of the horn by the axle. A brake support and treadle lever are mounted on the axle and provide for locking the caster wheel. A spring tab is formed integrally in the treadle lever. The spring tab is spring biased inwardly to force the brake support and the treadle lever apart. The maintenance of a constant tension separating the brake support and the treadle lever results in rattlefree operation of the caster assembly of the present invention.

19 Claims, 2 Drawing Sheets

CASTER ASSEMBLY

BACKGROUND OF THE INVENTION

The present invention relates to caster assemblies. More specifically, the present invention relates to a treadle lever having an integral spring tab for reducing caster rattle.

In a typical caster wheel assembly a brake support having a brake shoe thereon and a treadle are mounted near the caster wheel; some casters have the brake support and the treadle mounted on the same bolt or shaft as the caster wheel (e.g., see U.S. Pat. No. 1,863,349) and others mount the brake support and treadle about the caster's mounting or swivel axle (e.g., see U.S. Pat. Nos. 1,633,638 and 2,915,775). Casters using brakes and treadles have had noise problems originating from the treadle shaking and vibrating against other portions of the caster while the caster is in use. The resulting rattling noises have been addressed whereby, the caster horn, and brake support, and treadle are assembled to force these pieces physically together. Casters have also employed springs to bias the brake in a desired position, e.g., the brake off position.

However, rattling often returns as the parts wear.

SUMMARY OF THE INVENTION

The above-discussed and other drawbacks and deficiencies of the prior art are overcome or alleviated by the caster assembly of the present invention. In accordance with the present invention, the caster assembly comprises an inverted U-shaped horn member carrying an axle (i.e., a shoulder bolt). A wheel rotating on a spanner is supported between leg portions of the horn by the axle. The axle is retained on the horn member by a fastener. A brake support and treadle lever are provided for locking the caster wheel. The shoulder bolt has first and second shoulders with a larger diameter portion of the bolt therebetween. The brake support and the treadle lever are mounted on this larger diameter portion of the bolt and retained thereat by the second shoulder. The brake support includes an in turned tip working in a slot in the horn member to guide the brake support vertically, and includes adjacent the lower end thereof an out turned portion and upwardly therefrom an out turned tip which together encompass a central cam hub of the treadle lever. The cam hub is eccentric with respect to the axle.

In accordance with an important feature of the present invention, a spring tab is formed integrally in the treadle lever. The spring tab is spring biased inwardly to force the brake support and the treadle lever apart. The maintenance of a constant tension separating the brake support and the treadle lever results in rattle-free operation of the caster assembly of the present invention. The integral spring tab of the present invention leads to ease of assembly of the caster and reduces overall cost by: (1) eliminating the need to compensate for part tolerances; (2) reducing requirement for close tolerances on part thicknesses and shoulder lengths; and (3) eliminating the number of parts required for the caster, e.g., eliminating the additional springs and washers normally employed. Further, the integral spring tab of the present invention provides a constant tension throughout the stroke and provides a uniform 'feel' of braking action from caster to caster.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 3:
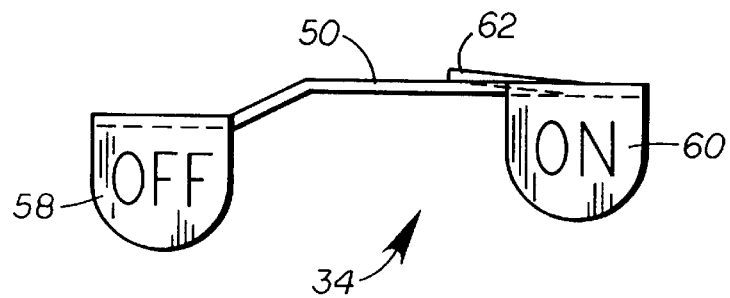
FIG. 3 is a plan view of the treadle lever of the swivel caster assembly of FIG. 1.
Figure 1:
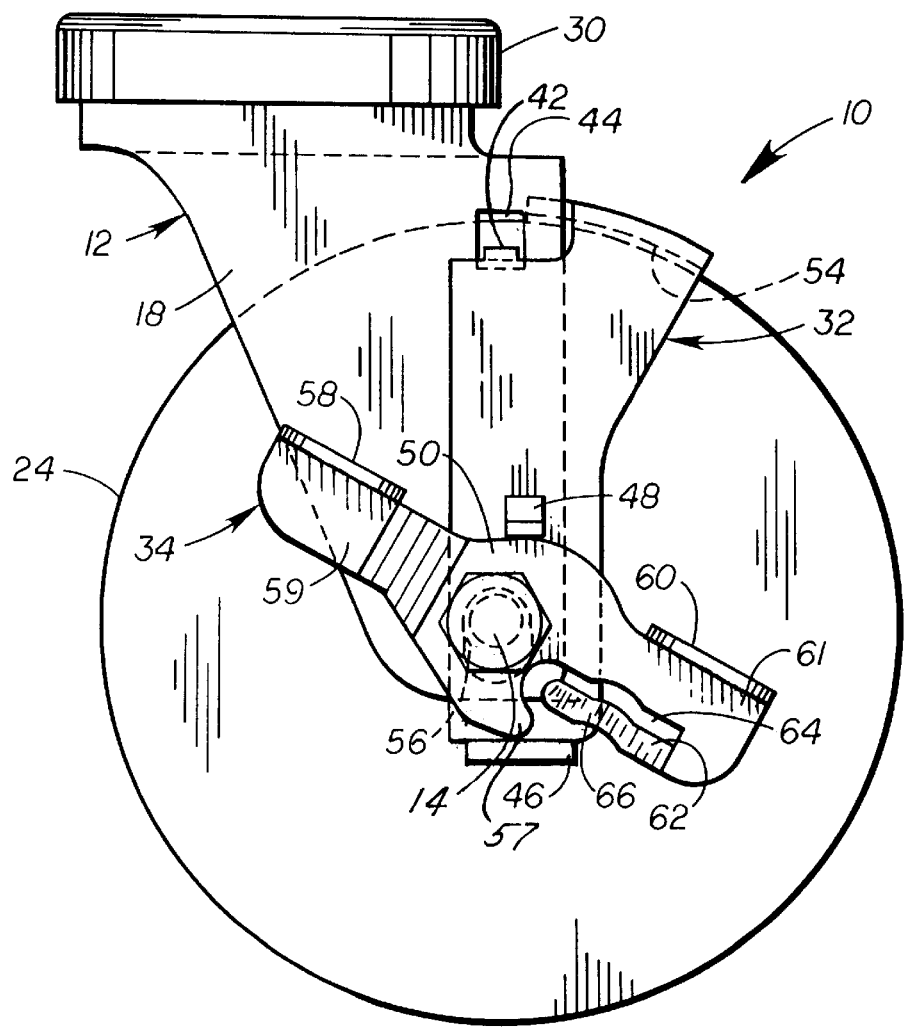
FIG. 1 is a side elevation view of a swivel caster assembly in accordance with the present invention, with the brake engaged.
Figure 2:
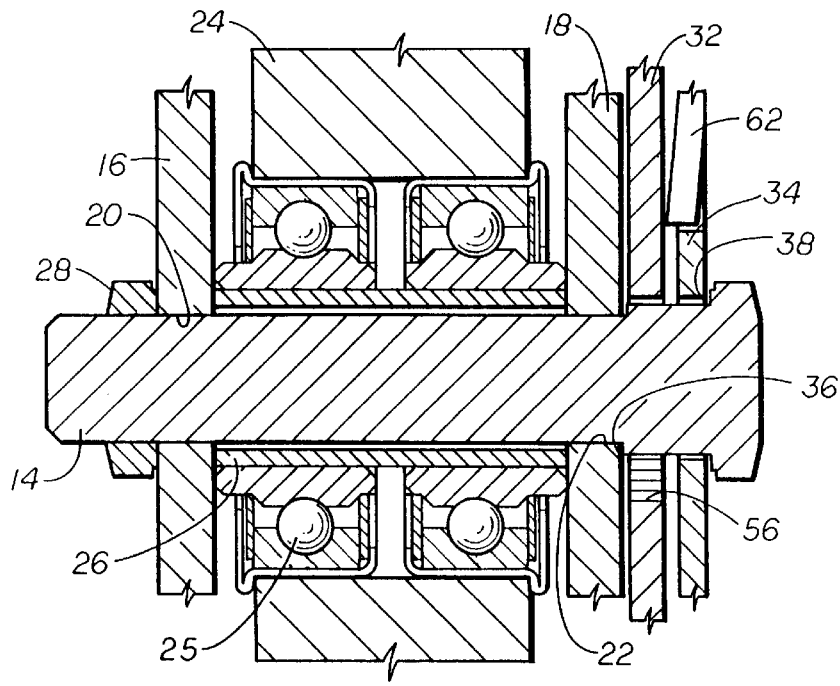
FIG. 2 is a partial cross sectional view of the swivel caster assembly of FIG. 1.

Referring now to FIGS. 1 and 2, a swivel type caster in accordance with the present invention is shown generally at 10. Caster 10 comprises an inverted U-shaped horn member 12 carrying an axle (i.e., a shoulder bolt) 14. Horn member 12 is typically constructed of a metal stamping with integral spaced leg portions (or forks) 16 and 18 having corresponding openings 20 and 22 that receive and retain axle 14 thereon. However, horn member 12 may be comprised of a plastic or other suitable material. A wheel 24 fitted with a set of flanged bearings 25 is disposed on a spanner 26. Spanner 26 is secured between leg portions 16 and 18 by a first shoulder 36 of bolt 14 and a fastener 28, whereby wheel 24 rotates freely about axle 14. Axle 14 is retained on horn member 12 by fastener 28. A bearing swivel assembly 30 is mounted on top of horn 12 as is well known in the art.

Figure 1A:
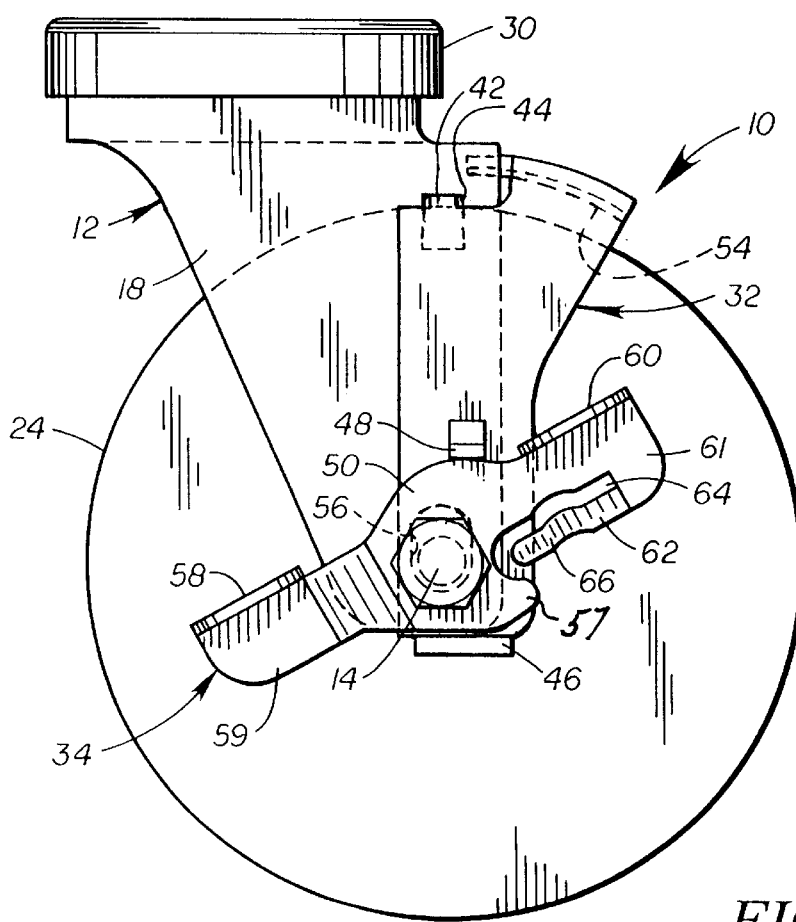
FIG. 1A is a side elevation view of the swivel caster assembly of FIG. 1, with the brake disengaged.

A brake support 32 and treadle lever 34 are provided for locking the caster wheel 24. First shoulder 36 of shoulder bolt 14 abuts fork 18. Shoulder bolt 14 further comprises a second shoulder 38, with a larger diameter portion of bolt 14 between shoulders 36 and 38. Brake support 32 and treadle lever 34 are mounted on this larger diameter portion of bolt 14 and retained thereat by shoulder 38. Brake support 32 is mounted to slide vertically. More specifically, brake support 32 includes an in turned tip 42 working in a slot 44 in leg portion 18 to guide the brake support vertically, and includes adjacent the lower end thereof an out turned portion 46 and upwardly therefrom an out turned tip 48 which together encompass a central cam hub 50 and 57 of treadle lever 34. Cam hub 50 and 57 are eccentric with respect to axle 14, whereby hub 50 and 57 acts like a cam, as it moves in a counter-clockwise direction (from a brake "ON" position, as shown in FIG. 1) it moves tip 48 upwardly whereby brake support 32 is moved upwardly causing a brake shoe 54 carried on brake support 32 to disengage wheel 24; and as it moves in a clockwise direction (from a brake "OFF" position, as shown in FIG. 1A) it moves portion 46 downwardly by a second portion 57 of CAM 50 whereby brake support 32 is moved downwardly causing brake shoe 54 to engage wheel 24. It will be noted that the mounting hole 56 of brake support 32 is elongated to allow the vertical movement thereof. Cam hub 50 is moved in a counter-clockwise direction by exerting a downward force on a peddle 58 depending from a lever portion 59 at one end of treadle lever 34 and a second portion 57 of cam 50 is moved in a clockwise direction by exerting a downward force on a peddle 60 depending from a lever 61 at the other end of treadle lever 34.

In accordance with an important feature of the present invention, a spring tab 62 is formed integrally in treadle lever 34. Spring tab 62 depends from lever portion 61 at one end of treadle lever 34 into central cam hub 50 and 57 area. Further, spring tab 62 is delineated from treadle lever 34 by a slot 64 which generally follows the contour of tab 62. Spring tab 62 is spring biased inwardly by an arcuate portion 66 to force brake support 32 and treadle lever 34 apart, as is clearly shown in FIG. 2. Treadle lever 34 is shaped and heat treated to provide a constant spring tab tension between brake support 32 and treadle lever 34 in all positions, i.e., from ON to OFF. The maintenance of a constant tension separating brake support 32 and treadle lever 34 results in rattle-free operation of the caster assembly of the present invention. While the spring tab is defined as being integral with the treadle lever, it is within the scope of the present invention that the spring tab is a separate component which is attached to the treadle lever by any known means.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A caster assembly comprising:
   a horn having at least one downwardly extending leg portion;
   an elongated member supported on at least one said leg portion of said horn;
   a wheel rotatably disposed on said elongated member; a brake disposed on said elongated member for engaging said wheel in an on position and disengaging said wheel in an off position;
   a treadle lever disposed on said elongated member for actuating said brake; and
   a spring integrally formed with said treadle lever, said spring positioned for exerting a separation force between said brake and said treadle lever when said brake is in said off position, whereby rattle of said caster during operation thereof is avoided.

2. The caster assembly of claim 1 wherein:
   said treadle lever comprises a cam hub portion eccentrically disposed on said elongated member.

3. The caster assembly of claim 2 wherein said treadle lever further comprises:
   at least one lever portion extending from said cam hub portion with said spring tab integrally formed in one of said at least one lever portions and said cam hub portion.

4. The caster assembly of claim 3 further comprising:
   a fastener connected at one end of said elongated member for retaining said at least one leg portion, said wheel, said brake, and said treadle lever on said elongated member.

5. The caster assembly of claim 3 further comprising:
   a peddle disposed on said at least one lever portion for actuation of said treadle lever.

6. The caster assembly of claim 2 wherein:
   said brake includes a pair of outwardly extending portions which engage said cam hub portion of said treadle lever, whereby rotation of said cam hub portion results in a generally vertical movement of said brake.

7. The caster assembly of claim 1 wherein said elongated member includes:
   a first diameter portion terminating at a first shoulder, said at least one leg portion and said wheel being disposed on said first portion and retained thereat by said first shoulder; and
   a second diameter portion extending from said first shoulder and terminating at a second shoulder, said brake and said treadle lever disposed on said second portion and retained thereat by said second shoulder.

8. The caster assembly of claim 1 further comprising:
   a spanner disposed about said elongated member with said wheel disposed on said spanner.

9. A caster assembly comprising:
   a horn having at least one downwardly extending leg portion;
   an elongated member having a first diameter portion terminating at a first shoulder and a second diameter portion extending from said first shoulder and terminating at a second shoulder, said first diameter portion at said first shoulder supported on said at least one leg portion of said horn;
   a wheel rotatably disposed on said first portion of said elongated member and retained thereat by said at least one leg portion;
   a brake disposed on second portion of said elongated member for engaging said wheel;
   a treadle lever having a cam hub portion eccentrically disposed on second portion of said elongated member and retained thereat by said second shoulder, said treadle lever having at least one lever portion extending from said cam hub portion, said treadle lever for actuating said brake; and
   a spring tab intergrally formed in one of said at least one lever portions and said cam hub portion, said spring tab biased for exerting a separation force between said brake and said treadle lever.

10. The caster assembly of claim 9 wherein:
    said brake includes a pair of outwardly extending portions which engage said cam hub portion of said treadle lever, whereby rotation of said cam hub portion results in a generally vertical movement of said brake.

11. The caster assembly of claim 9 further comprising:
    a peddle disposed on said at least one lever portion for actuation of said treadle lever.

12. A caster assembly comprising:
    a horn having at least one downwardly extending leg portion;
    an elongated member supported on at least one said leg portion of said horn;
    a wheel rotatably disposed on said elongated member;
    a brake disposed on said elongated member for engaging said wheel;
    a treadle lever disposed on said elongated member for actuating said brake;
    a spring positioned for extending a separation force between said brake and said treadle lever; and
    wherein said elongated member includes,
    (1) a first diameter portion terminating at a first shoulder, said at least one leg portion and said wheel being disposed on said first portion and retained thereat by said first shoulder, and
    (2) a second diameter portion extending from said first shoulder and terminating at a second shoulder, said brake and said treadle lever disposed on said second portion and retained thereat by said second shoulder.

13. The caster assembly of claim 12 wherein said spring is integrally formed with said treadle lever.

14. The caster assembly of claim 12 wherein:
    said treadle lever comprises a cam hub portion eccentrically disposed on said elongated member; and
    said spring comprises a spring tab integrally formed with said treadle lever.

15. The caster assembly of claim 14 wherein said treadle lever further comprises:

at least one lever portion extending from said cam hub portion, said spring tab being integrally formed in one of said at least one lever portions and said cam hub portion.

16. The caster assembly of claim 15 further comprising:

a fastener connected at one end of said elongated member for retaining said at least one leg portion, said wheel, said brake, and said treadle lever on said elongated member.

17. The caster assembly of claim 15 further comprising:

a peddle disposed on said at least one lever portion for actuation of said treadle lever.

18. The caster assembly of claim 14 wherein:

said brake includes a pair of outwardly extending portions which encompass said cam hub portion of said treadle lever, whereby rotation of said cam hub portion results in a generally vertical movement of said brake.

19. The caster assembly of claim 12 further comprising:

a spanner disposed about said elongated member with said wheel disposed on said spanner.

* * * * *